(12) United States Patent
Zhu

(10) Patent No.: US 9,853,462 B2
(45) Date of Patent: Dec. 26, 2017

(54) CONNECTION SCHEME FOR MULTIPLE BATTERY CELLS

(71) Applicant: Amperex Technology Limited, Hong Kong (HK)

(72) Inventor: Li-Yan Zhu, San Jose, CA (US)

(73) Assignee: Amperex Technology Limited, Hong Kong (CN)

( * ) Notice: Subject to any disclaimer, the term of this patent is extended or adjusted under 35 U.S.C. 154(b) by 293 days.

(21) Appl. No.: 14/675,810

(22) Filed: Apr. 1, 2015

(65) Prior Publication Data

US 2015/0207348 A1  Jul. 23, 2015

Related U.S. Application Data

(62) Division of application No. 12/459,654, filed on Jul. 6, 2009, now Pat. No. 9,005,788.

(51) Int. Cl.
*H01M 10/48* (2006.01)
*H01M 10/61* (2014.01)
(Continued)

(52) U.S. Cl.
CPC ......... *H02J 7/0021* (2013.01); *H01M 10/482* (2013.01); *H01M 10/617* (2015.04); *H01M 10/0525* (2013.01)

(58) Field of Classification Search
CPC ... H01M 10/482; H01M 10/617; H02J 7/0021
See application file for complete search history.

(56) References Cited

U.S. PATENT DOCUMENTS

| 3,872,457 A | 3/1975 | Ray et al. |
| 4,061,955 A | 12/1977 | Thomas et al. |

(Continued)

FOREIGN PATENT DOCUMENTS

| CN | 1747223 | 3/2006 |
| DE | 31 46 141 | 6/1983 |

(Continued)

OTHER PUBLICATIONS

European Search Report, Application No. 09847002.4-1373/2452391, Applicant: Amperex Technology Limited, dated Apr. 25, 2016, 9 pgs.

(Continued)

*Primary Examiner* — Ula C Ruddock
*Assistant Examiner* — Frank Chernow
(74) *Attorney, Agent, or Firm* — Saile Ackerman LLC; Stephen B. Ackerman; Billy Knowles

(57) ABSTRACT

A series-parallel battery system with a buffer resistor coupled to each junction of batteries or battery cells. Buffer resistors on the same row are coupled to a measurement node. Terminals of the battery system and the measurement nodes are treated as measurement points that are coupled to a conventional battery management unit. The buffer resistors provide a means for limiting in-rush current and a means for maintaining voltage balance across the row of batteries in the parallel columns of batteries. A control unit in series with each series of batteries monitors current in the series and comprises a switch to deactivate the column when the current exceeds a set of predetermined current levels.

6 Claims, 4 Drawing Sheets

(51) Int. Cl.
  *H02J 7/00* (2006.01)
  *H01M 10/617* (2014.01)
  *H01M 10/0525* (2010.01)

(56) References Cited

U.S. PATENT DOCUMENTS

| | | | |
|---|---|---|---|
| 4,931,738 A * | 6/1990 | MacIntyre | G01R 31/3682 |
| | | | 324/433 |
| 5,206,578 A | 4/1993 | Nor | |
| 5,578,914 A | 11/1996 | Morita | |
| 5,650,240 A | 7/1997 | Rogers | |
| 5,666,040 A | 9/1997 | Bourbeau | |
| 5,773,159 A | 6/1998 | Beard | |
| 5,821,733 A | 10/1998 | Turnbull | |
| 5,898,291 A | 4/1999 | Hall | |
| 5,956,241 A | 9/1999 | LoCascio | |
| 6,043,628 A | 3/2000 | Perelle et al. | |
| 6,114,835 A | 9/2000 | Price | |
| 6,150,795 A | 11/2000 | Kutkut et al. | |
| 6,160,375 A | 12/2000 | Horie et al. | |
| 6,417,646 B1 | 7/2002 | Huykman et al. | |
| 6,735,098 B2 | 5/2004 | Hussein et al. | |
| 6,777,908 B2 | 8/2004 | Thorne et al. | |
| 7,276,881 B2 | 10/2007 | Okumura et al. | |
| 7,394,225 B2 | 7/2008 | Guang et al. | |
| 7,459,882 B2 | 12/2008 | Morgan | |
| 2009/0111005 A1 * | 4/2009 | Hur | H02J 7/0031 |
| | | | 429/61 |

FOREIGN PATENT DOCUMENTS

| | | |
|---|---|---|
| DE | 34 38 783 | 12/1985 |
| JP | H05043086 | 6/1993 |
| JP | H06243899 | 9/1994 |
| JP | 2002 289263 | 10/2002 |
| JP | 2004 103483 | 4/2004 |
| WO | WO8602738 | 5/1986 |

OTHER PUBLICATIONS

Korean Office Action 10-2009-0103335, dated Sep. 17, 2015, Amperex Technology Limited.

* cited by examiner

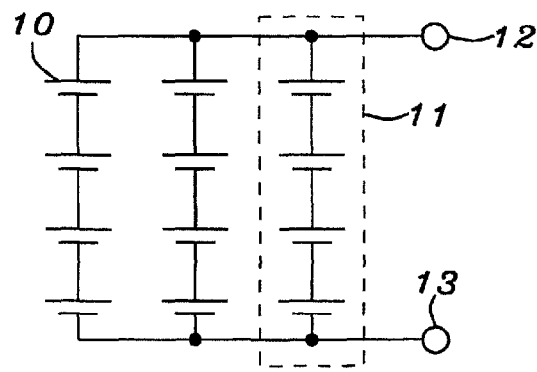
FIG. 1A - Prior Art
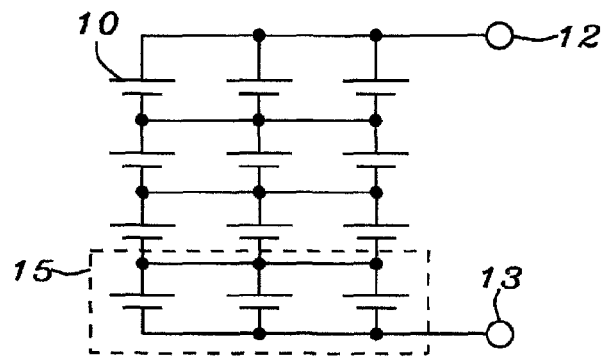
FIG. 1B - Prior Art
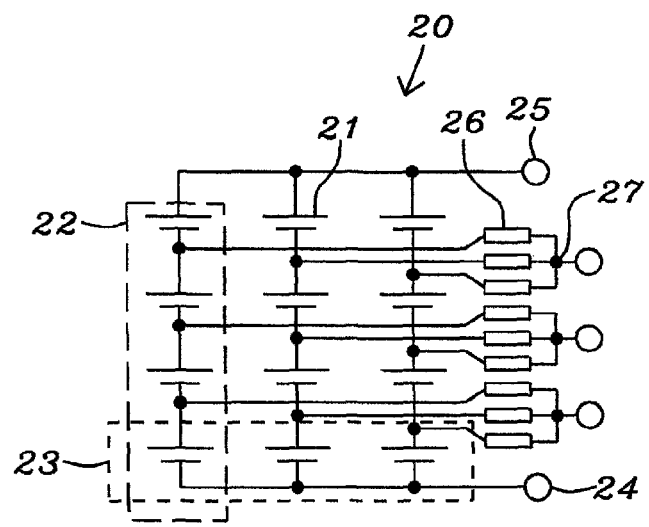
FIG. 2A

CONNECTION SCHEME FOR MULTIPLE BATTERY CELLS

The present disclosure is a divisional application that claims priority under 35 U.S.C. §120 from U.S. patent application Ser. No. 13/199,440, filing date Aug. 29, 2011, now U.S. Pat. No. 9,118,192, issued Aug. 25, 2015, assigned to a common assignee and herein incorporated by reference in its entirety.

BACKGROUND OF THE INVENTION

1. Field of Invention

This invention relates to batteries, in particular to large capacity secondary batteries comprising multiple cells.

2. Description of Related Art

A secondary battery is a rechargeable battery, whereas a primary battery is a battery that cannot be recharged. A lithium-ion secondary battery exhibits high voltage, high capacity, and low self-discharge, and is popular source of portable electrical energy. However compared with other types of secondary batteries, a lithium-ion battery poses greater safety hazard. Therefore constant monitoring and control of its current, voltage, temperature, and some other parameters under a battery management unit (BMU) are often required.

A cell is a basic electrochemical unit capable of storing electrical energy, but not necessarily resilient against handling and environmental stresses. A battery comprises at least one cell, and is physically resilient enough to survive reasonable handling. There is a significant overlap between these two definitions. In literature and in this disclosure, the word "battery" and the word "cell" are often used interchangeably.

Large capacity batteries in general comprise multiple cells connected in parallel to deliver the required current and in series to deliver the required voltage. In the simplest configuration, a plurality of cells are connected in series such as can be found in a typical flashlight. If more current is required at a particular voltage, an additional series of cells are connected in parallel to a first set of series connected cells.

Shown in FIG. 1A is a series-parallel connected battery scheme of prior art, where several columns 11 of series connected cells 10 are connected in parallel between a plus voltage output terminal 12 and a minus voltage output terminal 13. The number of cells in a column establishes the required voltage and the number of columns connected in parallel provide the required current. The series-parallel configuration ensures that current except for leakage current is identical throughout each column. Therefore, current distribution within the battery can be monitored and manipulated per column, and not per cell. When a short circuit develops in any column, inrush of current from other columns is limited by the internal resistance of all cells not containing the short. However in this configuration, the voltage of each cell needs to be monitored and balanced separately.

An alternative parallel-series scheme of prior art is shown in FIG. 1B, where a number of cells 10 are connected in parallel to form a row 15, and to provide the required current. Then a number of rows 15 are connected in series to provide the required voltage between the plus voltage output terminal and the minus output voltage terminal. In a parallel-series matrix of lithium-ion rechargeable cells, the voltage of each row needs to be monitored and balanced separately. Uniform current is not insured among parallel cells in any row 15, wherein, for instance, cell impedance can vary with local temperature. When a short-circuit develops in one of the cells, inrush of current from parallel cells is limited only by internal resistance of cells in a single row. Thus the inrush current is greater than that with a series-parallel configuration shown in FIG. 1A.

By elementary physics, current is inherently identical throughout each isolated series, while voltage is inherently identical across each parallel connected row. A series-parallel configuration and a parallel-series configuration each takes advantage of one of the above two laws of physics, to simplify current and voltage control, respectively. However neither configuration is able to simplify both current and voltage controls. A series-parallel configuration requires voltage control for each cell, while a parallel-series configuration suffers from the lack of current control for each cell. In a third configuration (not shown) voltage and current of each cell in a matrix of batteries are independently monitored and controlled providing a complex scheme. In addition more energy is dissipated as a result of the number of controllers that are needed.

U.S. Pat. No. 7,459,882 B2 (Morgan) is directed to an improved rechargeable battery, which comprises a plurality of battery cells connected together to discharge in parallel each of the cells, or each group, or groups of cells that have their own respective recharging input as well as a switching circuit to connect the cells or groups of cells to a charging input. In U.S. Pat. No. 7,394,225 B2 (Guang et al.) a multiple cell battery charger is directed to being configured in a parallel configuration to provide constant current charging. U.S. Pat. No. 7,276,881 B2 (Okumura et al.) is directed to a method of protection for preventing battery cells from over discharge and over charge. U.S. Pat. No. 6,777,908 B2 (Thorne et Al.) is directed to a battery cell balancing method and apparatus to balance cells within a battery where at some of the cells are arranged in series or a combination of series and parallel. U.S. Pat. No. 6,735,098 B2 (Hussein et al.) is directed to an inrush current limiting circuit, a power source device and a power conversion device. U.S. Pat. No. 6,417,646 B1 (Huykoman et al.) is directed to a circuit to protect individual cells of a multi-cell battery from overcharge and to collect data to determine of the cell state of health. In U.S. Pat. No. 6,160,375 (Horie et al.) a series arrangement of a plurality of lithium ion cells is directed to uniform cell charge, wherein a Zener diode and a resistor are connected in series between the positive and negative terminal of each cell to make uniform cell charge when a positive electrode crystal phase begins. U.S. Pat. No. 6,150,795 (Kutkut et al.) is directed to a battery charge equalization that is performed by modules in a staggered means between pairs of batteries in a series connected string of batteries. U.S. Pat. No. 6,114,835 (Price) is directed to a charge balancing circuit, which determines when to initiate a charge balance mode to equalize charge in at least two cells of a multi-cell battery.

U.S. Pat. No. 6,043,628 (Perelle et al.) is directed to a method and control for cells connected in series, wherein each cell is associated with a bypass that is activated by the controls and resulting from measurements in order to balance charge and discharge. In U.S. Pat. No. 5,956,241 (LaCascio) a battery power circuit comprising a cell equalization circuit is directed to insuring each cell in a multiple battery cell stack is depleted of charge at an equal rate. U.S. Pat. No. 5,821,733 (Turnbull) is directed to a system of charging for a multiple series connected battery cells and includes a plurality of shunt regulators. U.S. Pat. No. 5,773,159 (Beard) is directed to a battery pack comprising multiple lithium cells connected in series where a voltage miss match between the lithium cells utilizing circuitry contained within the battery pack. U.S. Pat. No. 5,666,040 (Bourbeau) is directed to a battery monitor and control system where electronic modules are connected to terminals of batteries connected in series to control over-voltage, under-voltage, over-temperature and float-voltage. U.S. Pat. No. 5,650,240 (Rogers) is directed to a multi-cell battery system for a battery of at least two cells, wherein a selective bypass can be selected for each of the cells of the multi-cell battery. U.S. Pat. No. 5,578,914 (Morita) is directed to a battery charging system, which is arranged to reduce a bypass capacity to enable a high current charging operation. U.S. Pat. No. 5,206,578 (Nor) is directed to a monitoring circuit for batteries while being charged, wherein the batteries comprise a series connection of cells to prevent damage to the cells. In U.S. Pat. No. 4,061,955 (Thomas et al.) a multi-cell battery system is disclosed where each cell has an individual protective circuit and wherein each cell is monitored for over charge and undercharge and a bypass circuit is used to remove a bad cell from the series connection of cells. U.S. Pat. No. 3,872,457 (Ray et al.) is directed to a self-monitoring system for batteries, which scans individual battery cells to detect faulty cells.

There exists a need, addressed by this invention, for a battery connection scheme that simplifies the monitor and control of both current and voltage. More specifically a novel scheme that ensures current uniformity, reduces inrush current, simplifies battery cell balancing and facilitates short detection is desired.

SUMMARY OF THE INVENTION

It is an objective of the present invention to provide a matrix of series-parallel connected battery cells with a spontaneous intra-row voltage balancing mechanism, so that inter-row voltage does not need to be monitored and controlled separately in each series.

It is another objective of the present invention to provide a matrix of parallel-series connected battery cells with adequate intra-row isolation, so that current is approximately identical throughout each series, that current distribution can be monitored and controlled between series, that each cell can be monitored separately for signs of pending failure, and that inrush current is reduced when a cell experiences an internal short.

The above objectives are achieved by a novel "hard-series soft-parallel" connection scheme, wherein a hard connection refers to a connection with negligible resistance, and a soft connection refers to a connection with appreciable resistance, following a convention used in the field of electrostatic discharge (EDS) control. The novel configuration combines features and advantages of series-parallel and parallel-series configurations. It degenerates to a series-parallel configuration if the buffer resistors have infinite resistance. It degenerates to a parallel-series configuration if the buffer resistors have zero resistance.

In a first embodiment of the present invention one or more series connected batteries are connected in parallel between the minus and positive terminals of the battery system forming a series-parallel battery configuration. Each series of batteries have the same number of batteries, or battery cells, connected between the minus and positive terminals of the battery system, where the minus terminal of a first battery in each series is connected to the minus terminal of the battery system. The minus terminal of a second battery in each series of batteries is connected to the positive terminal of the first battery. The negative terminal of a third battery of each series is connected to the positive terminal of the second battery in each series, and continuing on until the negative terminal of the nth battery is connected to the positive terminal of the n−1 battery. The negative terminal of the first battery in the series connection of batteries is connected to the negative terminal of the battery system, which in turn is connected to the battery management unit (BMU). The positive terminal of the nth battery of the series connection of n batteries is connected to the positive terminal of the battery system, which in turn is connected to the BMU.

Aline 4, pge7 resister, herein noted as a buffer resistor, is connected from the positive terminal of the first battery in each of the parallel series to a first measurement node 27 (FIG. 2) for the first batteries in the series of batteries connected in parallel. A buffer resistor is connected between to the positive terminal of the second battery in each of the parallel series of batteries to a second measurement node 27 for the second batteries in series of the batteries connected in parallel. A buffer resistor is connected between the positive terminal of the third battery in each series of batteries to a third measurement node 27 and continues to the nth battery where the positive terminal of the nth battery in each series is connected directly together forming a positive terminal of the battery system. Each of the buffer resistors is of a resistive value that is large enough to limit in-rush current when a cell develops a serious internal short, and large enough to limit inter-column current during normal operations. Therefore, the value of the buffer resistance is considerable higher than the internal resistance of the batteries to which the buffer resistors are connected. At the same time the buffer resistor value needs to be small enough to maintain voltage balance across the row of batteries in the parallel columns of batteries to which the buffer resistors are connected. The resistance values for the buffer resistors can be met if the resistance is less than the acceptable voltage deviation divided by the acceptable continuous balancing current. For example, if the operating current of a lithium battery is approximately 1 A, the acceptable continuous balancing current is less than 1 mA, and if a voltage imbalance of 10 mV is allowed, then the resistance of the buffer resistors can be in the order of 10 mV/1 mA=10 Ohms, which is much larger than the internal resistance of the batteries, which is in the order of 0.1 Ohms. When an internal battery short occurs, the inrush current can be more effectively limited by a resistance in the order of 10 Ohms than the internal resistance of the batteries, which is in the order of 0.1 Ohms.

The first, second and n−1 measurement nodes 27, the negative battery pack terminal 24, and the positive battery pack terminal 25, are coupled to a battery management unit (BMU) through a multiplexer, so that the battery voltage of can be measured one row at a time. When all batteries across the row are at the same voltage, no current flows through the buffer resistors and the voltage measurement node 27 is exact for all cells in the row. When battery voltages differ across the row, a current will flow through the buffer resistors and the voltage at the measurement node will be the average voltage across the row. This configuration is symmetrical in the sense that the each series is connected to the measurement nodes through the same resistance value. There are no distinct "primary" and "auxiliary" series. When a serious problem happens, comprising a short or a marked increase in internal resistance of a battery, the voltage of the measurement node will change markedly from the expected value and the BMU will measure an out of balance of the battery system In another embodiment of the present invention, one of the series 38 (FIG. 3) is selected as a "primary" series. All other series 39 are therefore "auxiliary" series. Battery terminals of the series are connected directly to the measurement nodes; battery terminals of auxiliary series are connected to the measurement nodes through butter resistors. Compared with the first embodiment, n−1 buffer resistors are saved, at the expense of symmetry. The primary series is balanced directly by the BMU. The other series is balanced indirectly, through the buffer resistors, by the primary series.

In another embodiment of the present invention, each series of batteries has connected in series with the batteries, a current control element 50 (FIG. 6) comprising one or more of the following components: a current sensing element, and a current control element. The current sensing element may be a resistor, a Hall sensor, or a magneto-resistive sensor. The current control component may include one or more of the following parts: an adjustable resistor for balancing the current distribution during assembly or scheduled maintenance, an electronic switch (e.g. a CMOS gate) in parallel with a low resistance resistor for in-situ control of current distribution between columns, and a switch for disconnecting the series when a problem is detected.

BRIEF DESCRIPTION OF THE DRAWINGS

This invention will be described with reference to the accompanying drawings, wherein:

FIG. 1A is a schematic diagram of prior art for a series-parallel connection of batteries;

FIG. 1B is a schematic diagram of prior art for a parallel-series connection of batteries;

FIG. 2A is a schematic diagram of the present invention for a symmetrical hard-series, soft-parallel hybrid connection of batteries with measurement nodes shared by multiple columns of series of batteries;

DETAILED DESCRIPTION OF THE PREFERRED EMBODIMENT

Figure 2B:
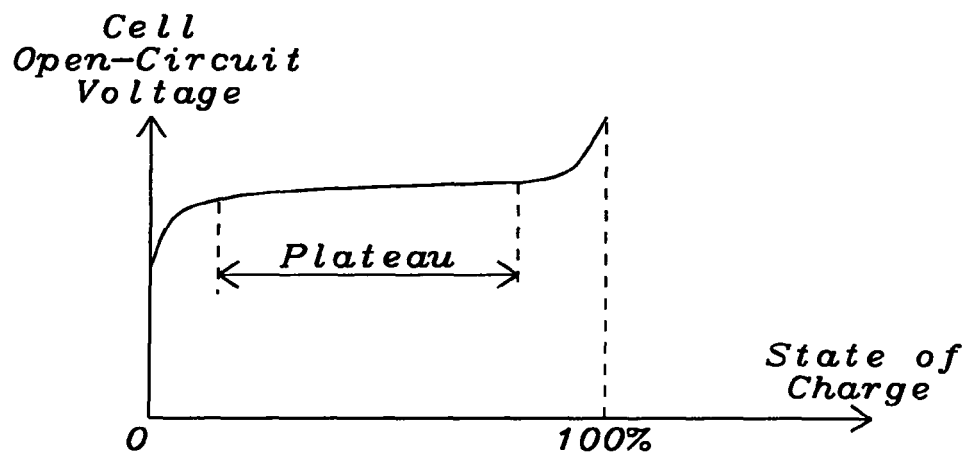
FIG. 2B is a graph of the present invention showing the relationship between open-circuit voltage and state of charge of a battery.

A series-parallel connection scheme in the prior art is characterized by electrical isolation between parallel-connected series, whereas a parallel-series connection scheme in the prior art is characterized by low-resistance electrical connection between parallel connected series. The conditions of "adequate electrical isolation" and "adequate electrical conduction" are not mutually exclusive, because events that call for electrical isolation and events that call for electrical connection exhibit drastically different time constants. Specifically, electrical isolation between columns is desirable during normal charging and discharging, which last hours or minutes. Electrical isolation between columns is also desirable when a cell develops internal short. In this case the damaging inrush current lasts minutes or seconds. In contrast, electrical connection across the row is desirable only for the purpose of voltage balancing, the time constant of which is in the order of months or years. A connection across each row can be made with an intermediate time constant, for example a few days, so that adequate isolation and adequate conduction are both achieved. This novel configuration can be characterized as a "hard-series, soft-parallel" configuration, wherein a hard connection refers to a connection with negligible resistance, and a soft connection refers to a connection with appreciable resistance. Since the novel configuration combines desirable characteristics of series-parallel and parallel-series configurations, it may be called a "hybrid" configuration.

Shown in FIG. 2A is a first embodiment of the present invention, which represents a symmetrical hard-series, soft-parallel arrangement 20 of batteries, or battery cells 21. The batteries 21 are connected in a column of series connected batteries 22 between the minus 24 and positive 25 terminals of the battery system, and then a number of these columns of series connected batteries are connected in parallel forming rows 23 of batteries across the columns. It should be noted that although FIG. 2 shows three columns 22 of four serial connected batteries 21, a more general configuration is m columns of n serial connected batteries that is within the scope of the present invention.

Connected to each positive terminal of each battery 21 is a resistor 26, except at the positive end of each series, which connects to the positive terminal 25 of the battery system. The resistors 26 of each row of batteries 23 are further connected to a measurement node 27. In FIG. 2 where n=4 there are n−1=3 measurement nodes. Each measurement node 27, together with the positive terminal 25 and negative terminal 24 are coupled to a BMU, which monitors and balances voltage between successive nodes or terminals, i.e., the voltage of each row 23. It is known in the prior art that a BMU typically contains a multiplexer (not shown), which allows a plurality of rows to be monitored successively, using a single analog to digital (A/D) converter. The BMU may also establish a shunt path to drain rows of excess charge, or transfer the excess charge to rows, which are deficient in charge. The resistors 26 have a resistance value that is higher than the internal resistance of each individual battery 21 to which the resistors are connected, where the internal resistance of the batteries is typically in the order of 0.1 Ohms. The resistors 26 need to be high enough in resistance to limit in-rush current when a battery shorts, and to limit inter-column current so that the normal operating current is substantially identical throughout the column. Resistance of resistor 26 also needs to be small enough in value to allow inter-column current to maintain voltage balance across a row of batteries 23.

The intra-column operating current of lithium-ion battery 21 is typically in the order of 1 Ampere, whereas an inter-column balancing current of less that 1 mA is all that is required to keep a battery 21 balanced with respect to other batteries 21 in the same row of batteries 23. Thus if a balance voltage of 10 mV is allowed, then the value of the resistor 26 can be allowed to be approximately 10 Ohms. This upper bound of 10 Ohms is much greater than the lower bound of 0.1 Ohm, which is the internal resistance of the batteries 21. An intermediate value of 1 Ohm will provide adequate barrier for inrush current, keep intra-column current substantially identical, and keep intra-column battery voltages balanced with ample margin.

It should be noted that the tolerance in voltage balance depends on the state of charge and the chemistry of the battery cell design. The state of charge is the ratio of available charge over the capacity of the battery. A lithium-ion battery typically exhibits a "plateau" in which the battery voltage is a weak function of its state of charge as shown in FIG. 2B. The maximum acceptable resistance of resistor 26 is denoted as Rmax and calculated by Rmax=($\Delta$SOC×[k])/i, where $\Delta$SOC is the tolerance in state of charge, i is the range of battery 21 self-discharge current, [k] is a weighted average of the slope in FIG. 2B and where the weighting factor is the expected time a battery 21 will spend on the corresponding state of charge.

It should also be noted that intra-column current required for voltage balancing is small, because intra-column balancing is spontaneous and continuous. In contrast, inter-row voltage balancing is controlled by the BMU, usually with a very low duty cycle. Specifically, most off-the-shell BMU performs inter-row voltage balance only during charging, and only when the charging is almost completed. Therefore a BMU designer may be accustom to a much larger balancing current requirement that what is needed in the novel soft-parallel connections.

The resistance of buffer resistors 26 can be optimized by an alternate approach, which focuses on the time-constant of intra-row current. It is understood by those skilled in the art that a battery cell exhibits a capacitance, which varies with its state of charge. The product of capacitance and resistance defines a time-constant of a cell with its buffer resistors, which should be much greater than the time-constant of inrush current in a conventional parallel-series configuration that is typically a few minutes, and much smaller than the time-constant of acceptable self-discharge that is typically a few months. Therefore, the acceptable range of resistance for buffer resistors 26 is very wide.

Design of buffer resistor 26 based on time-constant, rather than current, is especially convenient in the case columns 22 are not identical. For example, a battery system may be physically distributed in different locations, some of which have more space available than others. A battery system may also comprise of one or more columns of energy cells in parallel with one or more columns of power cells. Furthermore, one or more columns of cells may be added to an existing battery pack. In these cases, buffer resistors connected to each battery 21 should be designed such that each battery 21 together with its buffer resistor(s) 26 exhibit substantially the same time-constant.

Buffer resistors limit the dissipative balancing current of battery 21 to which they are connected. Specifically when a BMU shunts a row of batteries to drain excess charge, the discharge current must flow through buffer resistors 26. Ideally, the resistance of buffer resistors 26 should be selected such that no additional current limiter is necessary to further reduce the speed of inter-row voltage balancing. The first embodiment is symmetric in the sense that each column exhibits substantially the same time-constant, with respect to the pack terminals 24, 25 and measurement nodes 27. It should be noted, however, time-constant of batteries on the top and bottom rows, i.e., batteries directly connected to the pack terminals 24 or 25, is approximately half of time-constant of all other cells. This difference is due to the fact that both ends of each series must be connected directly to minimize transmission loss in the electrical power. Fortunately, the design margin of buffer resistors is much wider than the fact of two. Therefore the absence of buffer resistors in both ends of the battery pack does not seriously impair intra-column isolation in the top and bottom rows.

Figure 3:
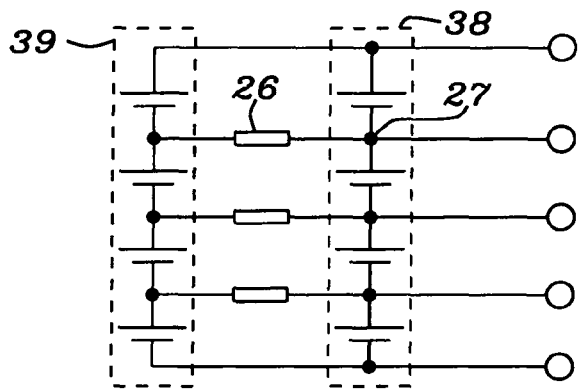
FIG. 3 is a schematic diagram of the present invention for an asymmetrical hard-series, soft-parallel hybrid connection of batteries with measurement nodes connected directly to a primary series of batteries.

Shown in FIG. 3 is a second embodiment of the present invention where one of the columns is connected directly to measurement nodes 27, without buffer resistors 26. This column is called a "primary series" 38. All other columns are coupled to measurement nodes 27 through buffer resistors 26, as in the first embodiment. Columns other than the primary series are called "auxiliary series" 39. Voltage of batteries 21 in the primary series are monitored and balanced directly through measurement nodes 27, whereas batteries 21 in auxiliary series are not monitored. Inter-row voltage balance in auxiliary series is achieved indirectly, by the primary series through buffer resistors 26.

Compared with the first embodiment, the second embodiment requires n−1 fewer buffer resistors 26. Often, this saving alone does not justify its loss of symmetry, because asymmetry complicates control, especially in inter-row voltage balancing. The second embodiment is preferred over the first embodiment when the inter-row voltage balancing involves a large charging current, which occurs when the balancing is accomplished by charge transfer rather than by dissipation, and when the balancing exhibits a very low duty cycle. In this case, the inter-row balancing charge can be transferred to a battery 21 in the primary series 38 quickly, and then spread to battery 21 in auxiliary series gradually to minimize heat dissipation. The second embodiment may also be preferred when an existing battery pack is expanded by appending an extra column of cells, because this embodiment requires less modification to the pack.

Figure 4A:
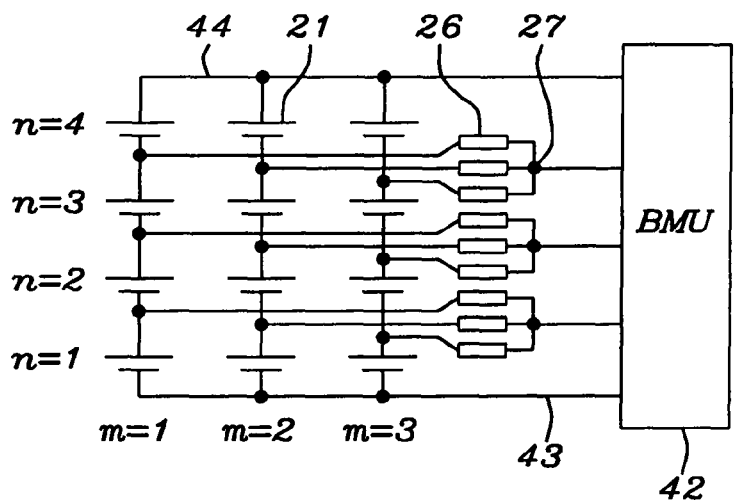
FIG. 4A is a schematic diagram of the present invention of a battery management unit (BMU) coupled to the measurement nodes of a symmetrical hard-series soft-parallel connected battery system.

In FIG. 4A is shown an example of the first embodiment of the present invention coupled to a BMU 42. The BMU is connected to measurement nodes 27, which are formed by the connecting together of the buffer resistors 26 that are connected to the positive battery terminals of each of the n to n−1 rows of batteries. The negative terminals of the n=1 row of batteries are connected together to form the negative terminal of the battery system and connected to the BMU 42. The positive terminals of the nth row of batteries are connected together to form the positive terminal of the battery system and connected to the BMU 42.

Figure 4B:
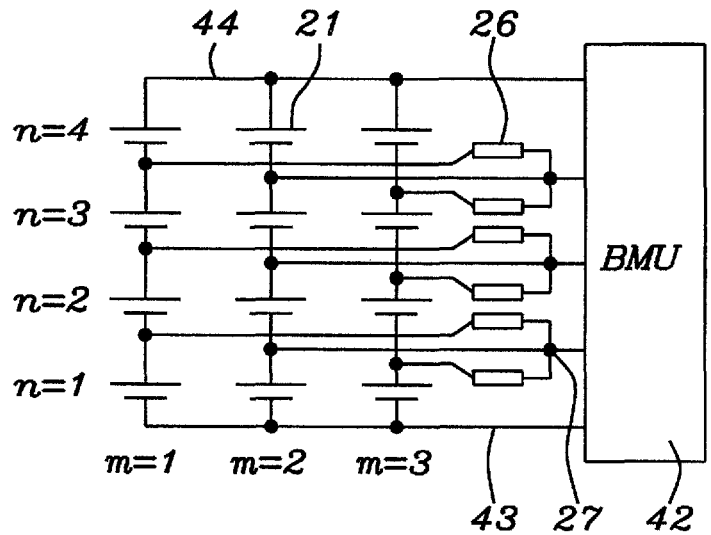
FIG. 4B is a schematic diagram of the present invention of a battery management unit (BMU) coupled to the measurement nodes of an asymmetrical hard-series soft-parallel connected battery system.

In FIG. 4B is shown an example of the second embodiment of the present invention coupled to a BMU, where the second column (m=2) is shown to be the primarily series. However the physical location of primary series is arbitrary. In both FIG. 4A and FIG. 4B, a hard-series, soft-parallel arrangement of batteries 21, or battery cells, is shown with n=4 batteries hard-connected in series, and m=3 columns soft-connected in parallel.

BMU pins and connections unaffected by this invention, for example connection to the temperature sensor(s), to the current sensor, and to the charge/discharge switches, are omitted for clarity. It should be noted that the BMU connection in both FIG. 4A and FIG. 4B are identical to that of a conventional parallel-series configuration. In the first embodiment, the voltage monitor and balancing algorithm, including parameter setting, can be identical to that of a conventional parallel-series configuration. In the second embodiment, the voltage balancing algorithm and parameter setting, may differ slightly from that with a conventional parallel-series configuration, to account for the gradual equalization between primary and auxiliary series. In general, a conventional parallel-series configuration can be upgraded to the novel hard-series, soft-parallel configuration without minimal effort.

Figure 5A:
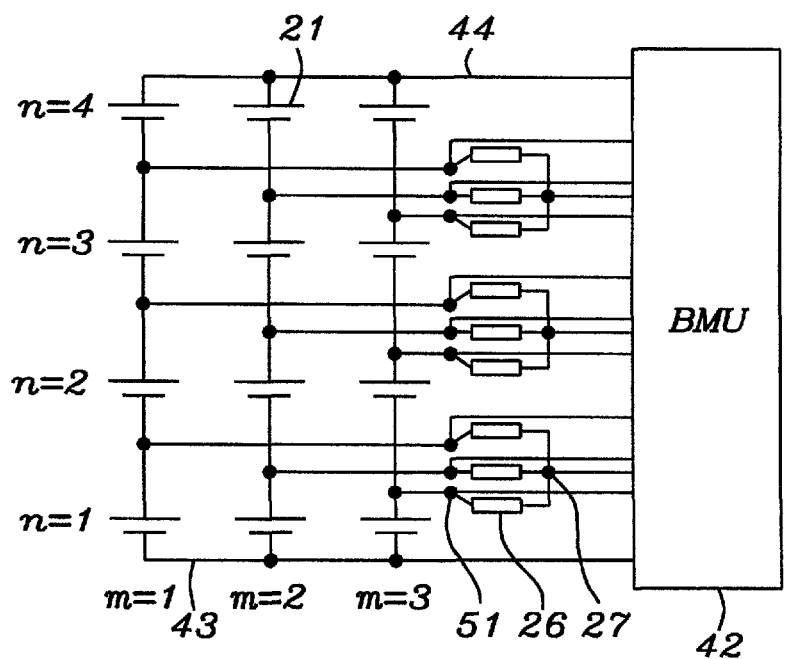
FIG. 5A is a schematic diagram of a novel symmetrical hard-series soft-parallel connected battery system in which voltage of each cell is monitored in addition to the voltage of measurement nodes.

In the first two embodiments described above, soft-parallel connected cells are not monitored individually. Signs of pending failure of single cell, for example an increase in self-discharge current, and a change in direct current resistance (DCR) or impedance, are difficult to detect because measurements are made at nodes 27 and not directly on the terminal of the cells. In FIG. 5A is shown a third embodiment of the present invention, where terminals 51 in the first embodiment are connected to the BMU so that individual cell voltages can be measured. Similarly in FIG. 5B is shown a fourth embodiment of the present invention, where terminals 51 in the second embodiment are connected to the BMU so that individual cell voltages can be measured.

Figure 5B:
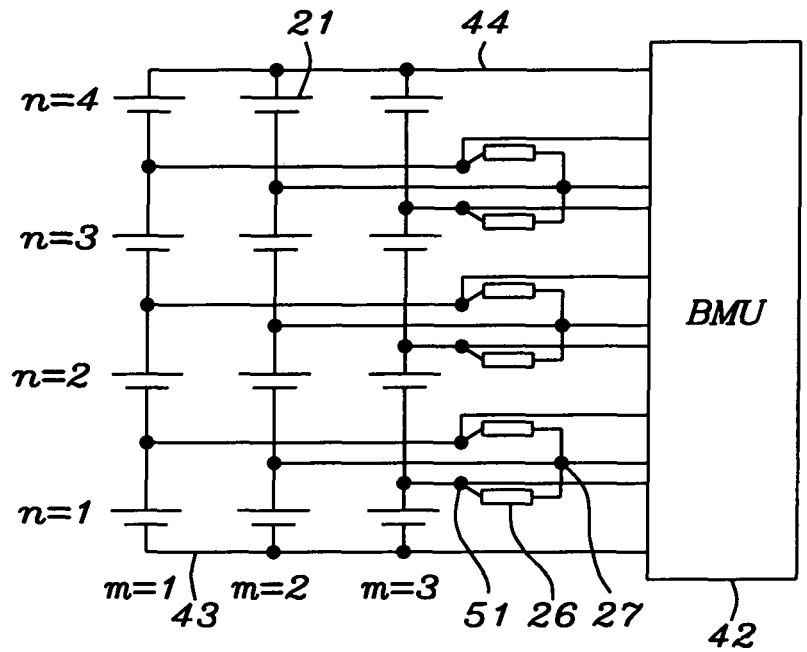
FIG. 5B is a schematic diagram of a novel asymmetrical hard-series soft-parallel connected battery system in which voltage of each cell is monitored by the BMU.

In both FIG. 5A and FIG. 5B, terminals 51 are connected directly to the BMU. It shall be understood by those skilled in the art that these voltages can be measured either simultaneously in parallel, or sequentially by multiplexing, which may be performed either outside or inside of the BMU. It should also be understood by those skilled in the art that instead of, or in addition to, the cell voltages, intra-row current to or from an individual cell may be monitored by a current-sensor, which may be either a small resistor inserted between terminals 51 and BMU 42, or a remote sensor positioned adjacent to the electrical lead between terminal 51s and BMU 42.

It should also be noted that figures and discussions herein are an example of a battery system and corresponding battery management system. The number of batteries n in series and the number of columns of batteries m in parallel are not limited to the example of any of the figures shown herein.

Figure 6:
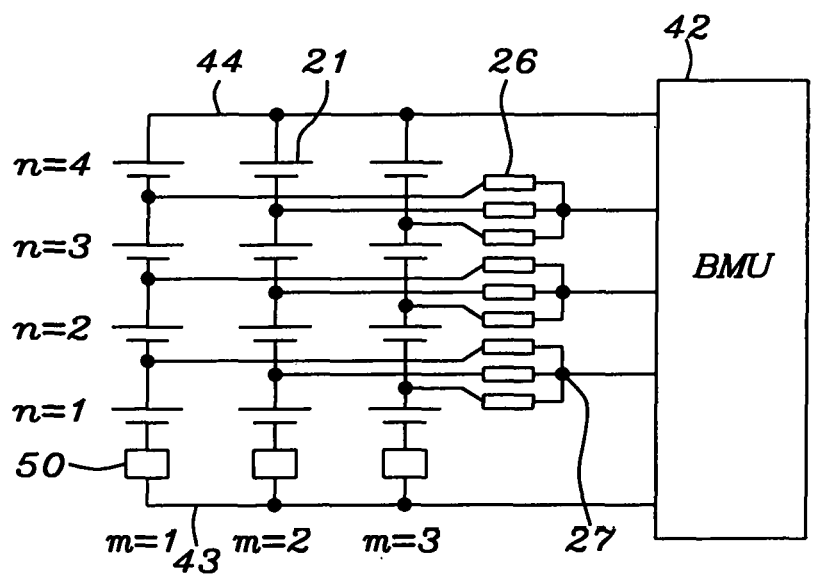
FIG. 6 is a schematic diagram of the present invention where a current control unit is connected in each series of the series-parallel battery system.

A major advantage of the present invention over a conventional parallel-series connection scheme is that in each of the four embodiments, current distribution among hard-series can be adjusted during assembly, or controlled during application. In FIG. 6 is shown a schematic diagram of the fifth embodiment of the present invention, wherein a control unit 50 is inserted in each column of cells in the first embodiment. Although control units 50, as shown, are connected between the negative terminal 43 and the n=1 row of cells, it should be noted that a control unit 50 can be inserted anywhere in the series. It should also be noted that control units 50 can be similarly inserted in the second, third, and fourth embodiments. The control unit 50 is in essence a variable resistor, which may be adjusted manually during assembly and maintenance, or controlled automatically during application. A control unit 50 comprises of one or more of the following elements: i) a switch, relay, or contact, which is inexpensive, yet useful in diagnostics, and allows a battery pack to work at reduced capacity, in case one series fails; ii) a fuse that can be activated by either temperature or current, where the fuse may or may not be able to be reset. A fuse protects a series from overload, or operating at excessively high temperature; iii) a positive thermal coefficient (PTC) device in which resistance increases monotonically, reversibly, and nonlinearly with temperature. A PTC may offset the negative thermal coefficient of cell internal resistance, thus reducing the sensitivity of current distribution to thermal gradient within the battery pack. A PTC also functions as a thermal fuse that can be rest; iv) a low-resistance adjustable resistor, for example a strip of conductor whose resistance may be decreased by adding a conductor in parallel (e.g., adding solder on the surface of strip, or soldering additional conductor to the strip), and increased by blocking the conductive path (e.g., punching a hole on the strip, or cutting off a portion of the strip). It is useful during assembly and maintenance; v) a current sensor; and vi) an electronic switch (e.g. a CMOS device), which may be used to control current distribution by feedback control. The design and construction of control unit 50 are quite flexible to those skilled in the art.

Control units 50 must be extremely reliable. A single failure may open a series and divert its share of current onto other series, thus overloading them. Control units 50 must also exhibit low power loss and heat generation. Efforts should be made to reduce or eliminate the need for unreliable or heat generating components. Before assembly, cells 21 should be selected and grouped such that capacity C is approximately identical among all cells 21 in the same series 22. In the design, the RC product of internal resistance R and capacity C of all series 22 must be identical in the entire matrix. The equality of RC must be verified during assembly and maintenance. Note that internal resistance R varies with temperature, and that temperature within the battery pack is not uniform. The battery and its thermal control system should be designed such that the average temperature of each series remains equal. This will minimize the effect of pack temperature variation on current distribution.

While the invention has been particularly shown and described with reference to preferred embodiments thereof, it will be understood by those skilled in the art that various changes in form and details may be made without departing from the spirit and scope of the invention.

What is claimed is:

1. A method for managing performance of a series-parallel battery system that comprises a plurality of batteries arranged in m columns such that each column comprises n batteries connected in series between the negative and positive terminals of the battery system, wherein m and n are integers greater than 1, the method for managing performance of a series-parallel battery system comprising the steps of:

forming a plurality of buffer resistors;
connecting a first terminal of each buffer resistor to a connection node of two batteries of the plurality of batteries on a common column of the batteries, such that n−1 buffer resistors of the plurality of buffer resistors are associated with one column of batteries of the m columns of batteries and m buffer resistors of the plurality of buffer resistors are associated with two rows of the batteries having the common connection;
connecting a second terminal of each of the m buffer resistors associated with the two rows of batteries having the common connection to form one measurement node of a plurality of measurement nodes;
monitoring a voltage level of present at each of the plurality of measurement nodes and the negative and positive terminals of the series-parallel battery system; and
providing a shunt path to drain the batteries of one row of excess charge and to transfer the excess charge to at least one selected row of the batteries, which are deficient in charge for balancing the charge of the plurality batteries.

2. The method of claim 1, further comprising the steps of measuring current flow in each of m columns for detecting excess current level in each of the m columns; and adjusting or disconnecting the current flow in one column of the m columns to prevent over temperature or overload when there is the excess current level in the one column.

3. The method of claim 1, wherein said buffer resistors have a resistance approximately ten times larger than an internal resistance of the battery cells to limit in-rush current and to allow inter column current flow to maintain a voltage balance across said row of battery cells in the m columns.

4. The method of claim 1, wherein said buffer resistors coupled to m−1 columns of battery cells, and the mth column of battery cells coupled directly to said measurement nodes.

5. The method of claim 1 wherein all said battery cells of each of the m columns are selected and grouped such that the battery cells in each of the m columns have approximately equal capacity, and a product of cell capacity and cell internal resistance is approximately equal for all the battery cells in all rows and columns in the battery system.

6. The method of claim 1, wherein each of the n battery cells in each of the m columns include a cooling system that maintains an average temperature of the n battery cells in each of the m columns that is approximately equal.

* * * * *